United States Patent
Gedliczka et al.

(10) Patent No.: US 11,429,688 B2
(45) Date of Patent: Aug. 30, 2022

(54) CORRECTING A URL WITHIN A REST API CALL

(71) Applicant: International Business Machines Corporation, Armonk, NY (US)

(72) Inventors: Tymoteusz Gedliczka, Cracow (PL); Tomasz Kania, Tarnow (PL); Piotr Grzywna, Cracow (PL); Krzysztof Pitula, Tarnow (PL); Maciej Madej, Cracow (PL); Szymon Brandys, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 16/824,614

(22) Filed: Mar. 19, 2020

(65) Prior Publication Data

US 2021/0294869 A1    Sep. 23, 2021

(51) Int. Cl.
  *G06F 17/10*  (2006.01)
  *G06F 16/955*  (2019.01)
  *G06N 5/04*  (2006.01)
  *G06N 20/00*  (2019.01)

(52) U.S. Cl.
  CPC ......... *G06F 16/9566* (2019.01); *G06N 5/047* (2013.01); *G06N 20/00* (2019.01)

(58) Field of Classification Search
  CPC ..... G06F 16/9566; G06N 5/047; G06N 20/00
  See application file for complete search history.

(56) References Cited

U.S. PATENT DOCUMENTS

| | | | | |
|---|---|---|---|---|
| 5,892,919 A * | 4/1999 | Nielsen | ................... | H04L 61/58 715/260 |
| 7,966,310 B2 * | 6/2011 | Sullivan | .............. | G06F 16/9566 707/716 |
| 8,180,759 B2 * | 5/2012 | Hamzy | ................. | G06F 40/232 707/767 |
| 8,307,073 B1 * | 11/2012 | Brundage | ........... | G06F 11/0793 709/224 |
| 9,286,408 B2 * | 3/2016 | Koutrika | ............... | G06F 40/237 |

(Continued)

FOREIGN PATENT DOCUMENTS

| | | | | |
|---|---|---|---|---|
| JP | 2017033221 A | | 2/2017 | |
| WO | WO-0135241 A1 * | | 5/2001 | ......... G06F 16/9566 |
| WO | 2002069607 A2 | | 9/2002 | |

OTHER PUBLICATIONS

"Web application firewall", Wikipedia, This page was last edited on Oct. 15, 2019, at 21:07 (UTC), 4 pages.

(Continued)

*Primary Examiner* — Shahid K Khan
(74) *Attorney, Agent, or Firm* — David B. Woycechowsky

(57) ABSTRACT

Technology for making corrections to URL and/or URI requests (herein generically referred to as "UR requests") based on machine learning of patterns that can be gleaned from previously received UR requests. The patterns are then used to correct new UR requests that are received with errors in the resource location path. In some embodiments, the errors detected and corrected are path errors. In some embodiments the path error is an erroneous inclusion of an extraneous reserved slash ("/") character, which, when detected, is replaced in the UR string with its corresponding proper code (for example, - -%2F- -).

15 Claims, 4 Drawing Sheets

(56) References Cited

U.S. PATENT DOCUMENTS

| | | | |
|---|---|---|---|
| 10,725,763 B1* | 7/2020 | Chud | G06F 11/079 |
| 2003/0014450 A1* | 1/2003 | Hoffman | G06F 16/9566 |
| | | | 707/E17.115 |
| 2012/0158626 A1* | 6/2012 | Zhu | G06F 21/56 |
| | | | 726/22 |
| 2013/0275403 A1 | 10/2013 | Liu | |
| 2020/0162484 A1* | 5/2020 | Solis Agea | H04L 63/1416 |
| 2020/0314135 A1* | 10/2020 | Kang | H04L 9/0643 |

OTHER PUBLICATIONS

Le et al., "URLNet: Learning a URL Representation with Deep Learning for Malicious URL Detection", arXiv:1802.03162v2 [cs.CR] Mar. 2, 2018, Conference'17, Jul. 2017, Washington, DC, USA, ACM ISBN 123-4567-24-567/08/06, https://doi.org/10.475/123_4. 13 pages.

\* cited by examiner

UR CORRECTIONS OPERATION LOG

T1. CLIENT 104 SUBMITTED THE FOLLOWING NEW URI REQUEST:
GET /USERS/WONDERLAND/ALICE/BOOKSHELVES

T2. IT WAS DETERMINED THAT THIS REQUEST WAS LIKELY
ERRONEOUS AND THE REQUEST WAS AUTOMATICALLY
REPLACED WITH THE FOLLOWING CORRECTED URI REQUEST:
GET /USERS/WONDERLAND%2FALICE/BOOKSHELVES

T3. THE CORRECTED URI REQUEST WAS SUCCESSFULLY USING
REST RESOURCES AT REST SERVER LOG AND RESULTS
RETURNED TO CLIENT 104

CORRECTING A URL WITHIN A REST API CALL

BACKGROUND

In a typical modern web application, there are REST (representational state transfer) API (application programming interface) requests coming from a browser of a client computer, over a communication network, to a server computer. The target of the REST API call is determined by the URL (uniform resource locator) of the call. The URL typically includes URL portions that carry some parameter values for use in responding to the REST call, such as, path segment parameter value(s) and query string parameter value(s).

"Percent encoding" (also sometimes herein referred to as "URL encoding") is hereby defined, for the purposes of this document, as follows: taking an initial string for use in a URL, URI, or the like that includes reserved characters, and replacing the reserved character(s) in the URI or URL with a predefined special character sequence. For example, if one wanted to make a URL including the string "HOT/COLD" then currently conventional percent encoding might form the URL as "www.school.edu/hot%2fcold", where the special character representing the slash character is "%2f". While special character sets representing reserved characters typically start with a percent sign, the identity of a character indicating a special character set could be other character(s) other than the percent sign depending on the encoding scheme.

"HTTP response status codes" are explained in the Wikipedia entry for "List of HTTP status codes" (as of 27 Jan. 2020) as follows: "Status codes are issued by a server in response to a client's request made to the server. It includes codes from IETF Request for Comments (RFCs), other specifications, and some additional codes used in some common applications of the HTTP. The first digit of the status code specifies one of five standard classes of responses. The message phrases shown are typical, but any human-readable alternative may be provided. Unless otherwise stated, the status code is part of the HTTP/1.1 standard (RFC 7231). The Internet Assigned Numbers Authority (IANA) maintains the official registry of HTTP status codes. Microsoft Internet Information Services (IIS) sometimes uses additional decimal sub-codes for more specific information, however these sub-codes only appear in the response payload and in documentation, not in the place of an actual HTTP status code. All HTTP response status codes are separated into five classes or categories. The first digit of the status code defines the class of response, while the last two digits do not have any classifying or categorization role." (footnotes omitted)

The Wikipedia entry for Hypertext Transfer Protocol (as of 27 Jan. 2020) explains "HTTP request methods" as follows: "HTTP defines methods (sometimes referred to as verbs, but nowhere in the specification does it mention verb, nor is OPTIONS or HEAD a verb) to indicate the desired action to be performed on the identified resource. What this resource represents, whether pre-existing data or data that is generated dynamically, depends on the implementation of the server. Often, the resource corresponds to a file or the output of an executable residing on the server. The HTTP/1.0 specification defined the GET, HEAD and POST methods and the HTTP/1.1 specification added five new methods: OPTIONS, PUT, DELETE, TRACE and CONNECT. By being specified in these documents, their semantics are well-known and can be depended on. Any client can use any method and the server can be configured to support any combination of methods. If a method is unknown to an intermediate, it will be treated as an unsafe and non-idempotent method. There is no limit to the number of methods that can be defined, and this allows for future methods to be specified without breaking existing infrastructure. For example, WebDAV defined 7 new methods and RFC 5789 specified the PATCH method. Method names are case sensitive. This is in contrast to HTTP header field names which are case-insensitive." (footnotes omitted)

The Wikipedia entry for Hypertext Transfer Protocol (as of 27 Jan. 2020) explains "safe HTTP methods" as follows: "Some of the methods (for example, GET, HEAD, OPTIONS and TRACE) are, by convention, defined as safe, which means they are intended only for information retrieval and should not change the state of the server. In other words, they should not have side effects, beyond relatively harmless effects such as logging, web caching, the serving of banner advertisements or incrementing a web counter. Making arbitrary GET requests without regard to the context of the application's state should therefore be considered safe. However, this is not mandated by the standard, and it is explicitly acknowledged that it cannot be guaranteed. By contrast, methods such as POST, PUT, DELETE and PATCH are intended for actions that may cause side effects either on the server, or external side effects such as financial transactions or transmission of email. Such methods are therefore not usually used by conforming web robots or web crawlers; some that do not conform tend to make requests without regard to context or consequences."

SUMMARY

One aspect of the present invention is directed to a computer implemented method, a computer system and/or a computer program product for performing at least the following operations (not necessarily in the following order): (i) receiving a plurality of historical UR (uniform resource) data sets, with each historical UR data set including information indicative of a UR path string; (ii) determining, by machine logic, a first UR pattern based on at least some UR data sets of the plurality of UR data sets; (iii) receiving a new UR data set, with the new UR data set including information indicative of a new UR path string; (iv) determining, by machine logic, that the UR path string of the new UR data set is close to the first pattern and has an error that prevents the UR path string of the new UR request from fully matching the first pattern; and (v) correcting, by machine logic, the UR path string of the new UR data set, to fully match the first pattern to obtain a corrected version of the new UR data set.

BRIEF DESCRIPTION OF THE DRAWINGS

FIG. 4 is a screenshot view generated by the first embodiment system; and

DETAILED DESCRIPTION

Figure 1:
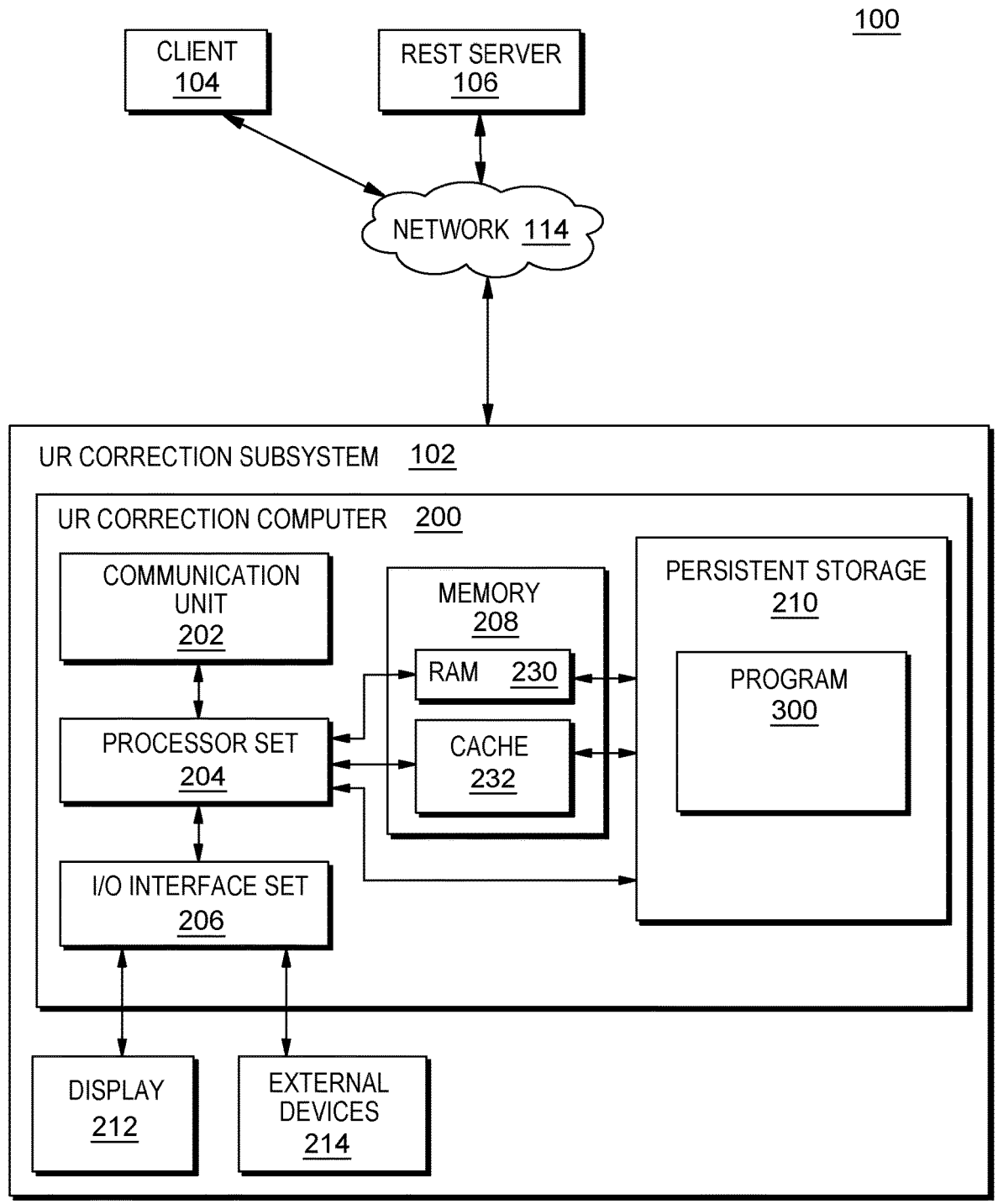
FIG. 1 is a block diagram view of a first embodiment of a system according to the present invention.

Some embodiments of the present invention may be directed to technology for making corrections to URL and/or URI requests (herein generically referred to as "UR requests") based on machine learning of patterns that can be gleaned from previously received UR requests. The patterns are then used to correct new UR requests that are received with errors in the resource location path. In some embodiments, the errors detected and corrected are path errors. In some embodiments the path error is an erroneous inclusion of an extraneous reserved slash ("/") character, which, when detected, is replaced in the UR string with its corresponding proper code (for example, - -%2F- -).

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: uniform resource (UR) correction sub-system 102; client sub-system 104; REST server sub-system 106; communication network 114; UR correction computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
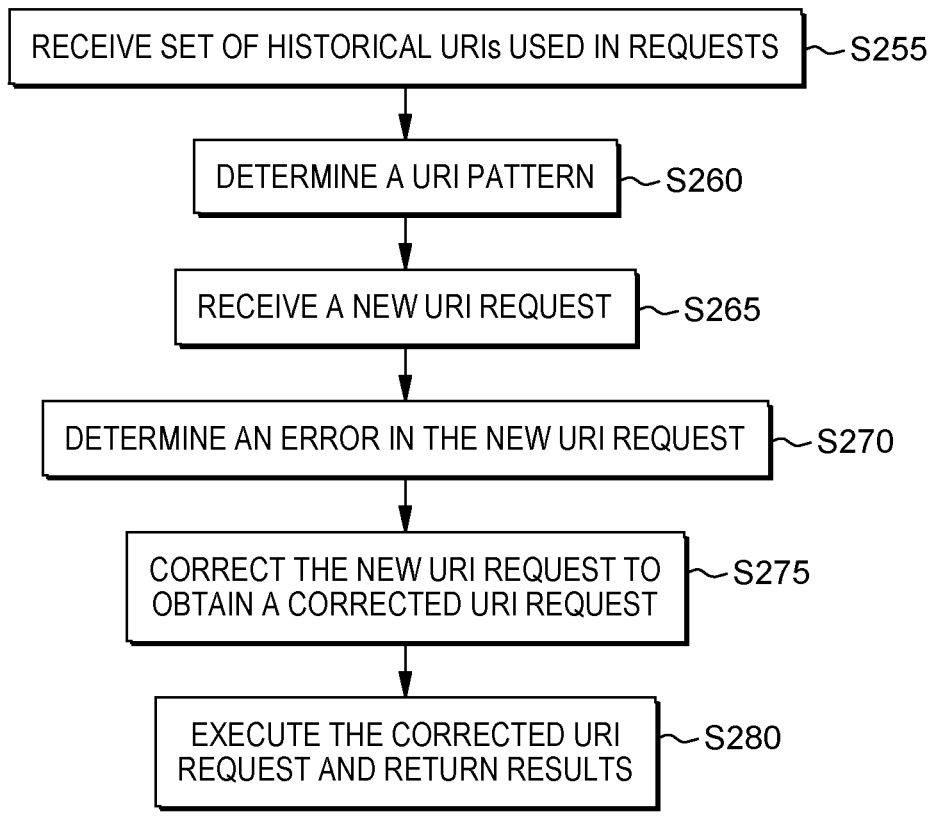
FIG. 2 is a flowchart showing a first embodiment method performed, at least in part, by the first embodiment system.
Figure 3:
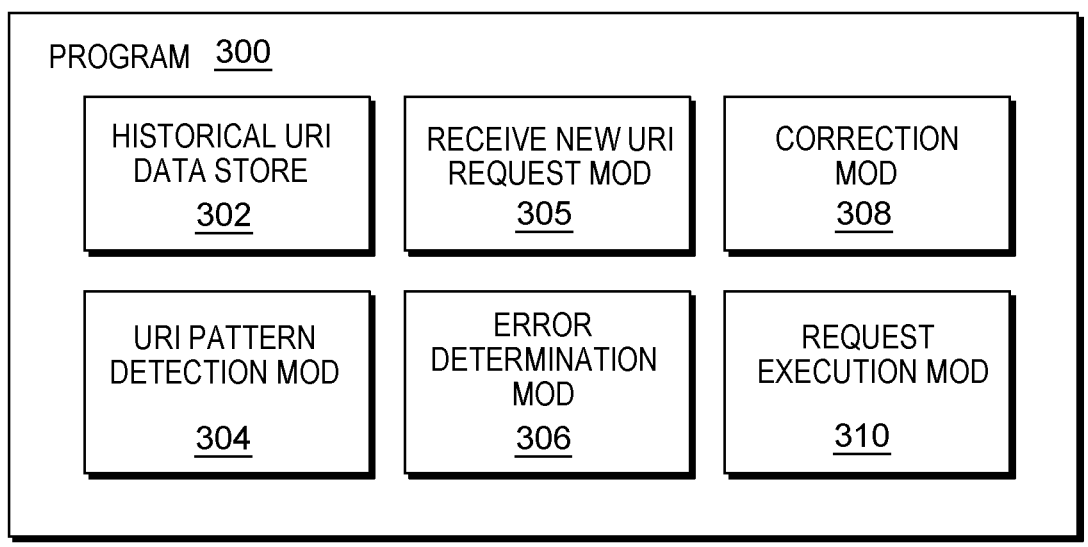
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where historical URI data store 302 receives a set of previously encountered URI/URL requests that each contain a URL and/or URI. In this embodiment, the data store receives all of the historical requests at once. Alternatively, a store of requests may be received and analyzed over a period of time. In this example, the historical requests are pre-screened so that only properly formed and syntaxed requests are in stored in data store 302. In this example, the data store includes millions of historical URI/URL requests, but, as will be seen in the discussion of the next operation, only a small subset of these historical requests are relevant in this particular example of flowchart 250. In this example, some historical requests were generated automatically by machine logic, while other historical requests were generated by human requesters.

Processing proceeds to operation S260, where URI pattern detection mod 304 detects a pattern that runs through many UR requests (that is, URI requests, URL requests, any other requests for a Uniform Resource). In this example, the machine logic of mod 304 first isolates a subset of requests that have a high degree of similarity. In this example, the subset of 25 similar historical requests (listed below) has a high degree of similarity, and, more specifically, each request of the subset has: (i) three (3) UR attributes (also called UR path segments, as explained above in the Background section); (ii) three (3) separator characters (that is, "/" characters) separating the three (3) UR path segments; (iii) a common, identical non-reserved character string as the first UR attribute (or path segment); and (iv) a common, identical non-reserved character string as the third attribute. In addition to the similarities, there are also differences as can be appreciated from the following full listing of the 25 similar historical requests identified in data store 302 by mod 304:
GET /USERS/ABLE/BOOKSHELVES
POST /USERS/BAKER/BOOKSHELVES
DELETE /USERS/CHARLIE/BOOKSHELVES
GET /USERS/DAN/BOOKSHELVES
GET /USERS/EDGAR/BOOKSHELVES
GET /USERS/FAY/BOOKSHELVES
GET /USERS/GERT/BOOKSHELVES
GET /USERS/HENRY/BOOKSHELVES
GET /USERS/ICHABOD/BOOKSHELVES
DELETE /USERS/JANICE/BOOKSHELVES
GET /USERS/KELLY/BOOKSHELVES
PUT /USERS/LENORE/BOOKSHELVES
GET /USERS/MONICA/BOOKSHELVES
GET /USERS/NED/BOOKSHELVES
GET /USERS/OLIVE/BOOKSHELVES
GET /USERS/PETER/BOOKSHELVES
GET /USERS/QQQQQQ/BOOKSHELVES
GET /USERS/ROGER/BOOKSHELVES
GET /USERS/SALLY/BOOKSHELVES
GET /USERS/TIM/BOOKSHELVES
GET /USERS/URBK/BOOKSHELVES
GET /USERS/VICTORIA/BOOKSHELVES
PUT /USERS/ WOJCIECH/BOOKSHELVES
GET /USERS/X15_X16/BOOKSHELVES
GET /USERS/YOLANDA/BOOKSHELVES Based on this subset of 25 similar historical requests, the machine logic of mod 304 determine the following UR pattern (sometimes herein called a "URI pattern"):
[COMMAND] /USERS/[CHARACTER STRING]/BOOKSHELVES
To explain the pattern a bit, in this particular example: (i) the syntax of the command can vary; (ii) the first UR attribute must have the value "USERS"; (iii) the second UR attribute can vary so long as it is an alphanumeric character string of non-reserved character(s); and (iv) the third UR attribute has the value of "BOOKSHELVES".

Processing proceeds to operation S265, where receive new URI request mod 305 of program 300 of UR correction subsystem 102 receives a new URI request from client subsystem 104 through communication network 114 (see FIG. 1). In this example, the new request is generated by a human user. Alternatively, it could be generated automatically by machine logic. As mentioned in the next sub-section of this Detailed Description section, in some systems, all of the UR type requests are generated by machine logic. This can be important for the designer to know because machine generated UR type requests tend to be subject to somewhat different types of errors than human generated ones. As shown in screenshot 400 of FIG. 4, the new UR type request (in this example, a URI request) is as follows:
GET /USERS/WONDERLAND/ALICE/BOOKSHELVES Processing proceeds to operation S270, where error determination mod 306 determines: (i) the new UR type request is sufficiently similar to the URI pattern established at operation S260 such that the request was likely intended to follow that URI pattern (specifically, in this example, the first and last URL attributes, "USERS" and "BOOKSHELVES" are within the expected parameter value ranges of the pattern); and (ii) the request does not fall within the strictures of the URI pattern because username WONDERLAND/ALICE contains slash (path segment separator) and the URL now seems to have four path segments instead of three.

The particular type of error identified in the previous paragraph is a path error because the extra slash leads to an incorrect path in the newly-received request. Alternatively, or additionally, other embodiments according to the present invention may deal with errors other than path errors, such as: (i) spelling errors that occur within the URL attributes (for example, if "USERS" were misspelled as "UAERS"); and/or (ii) missing or misspelled command errors (for example, if the request started with "GETGET" or if the command portion of the request were placed after the path portion of the request).

In the method of flowchart 250, the new request is not first checked to see if it works (as received) before performing pattern based error detection. Alternatively, the request may be tried and determined to produce erroneous results before undertaking the performance of error detection.

Processing proceeds to operation S275, where correction mod 308 corrects the syntax of the new request to obtain a corrected UR type request. In this example, the machine logic of mod 308 automatically obtains the following corrected UR type request:
GET /USERS/WONDERLAND%2FALICE/BOOKSHELVES Notice that this revised request syntax corrects the path error because the path now includes only three (3) slashes and three (3) URL segments as was clearly originally intended. Processing proceeds to operation S280, where request execution mod 310 executes the corrected UR type request by: (i) sending it through communication network 114 to REST server sub-system 106 (see FIG. 1); and (ii) sub-system 106 sends the requested resource to client sub-system 104. In this case data is sent to client sub-system 104 because the request is a GET type request. As is well understood in the art, other UR related commands will cause the UR server to perform other types of actions with respect to the requested resource(s).

III. Further Comments and/or Embodiments

Some embodiments of the present invention recognize one, or more, of the following problems, challenges, shortcomings, facts and/or opportunities for improvement with respect to the current state of the art: (i) it is important to properly encode URL components so that the special characters in the parameters are not confused with actual separators in the URL; (ii) some (ii) web applications may work for a long time without problems even if there is no proper URL encoding—this happens if all the actual variables values used in the URL include only characters that do not require URL encoding (for example, an alphanumeric string); (iii) the lack of proper URL encoding can fail to be discovered, at least initially, during tests of the web application; (iv) in a production setting use of the encoded URL components, all of a sudden, an end user (for example, a customer) may provide some input, which contains special characters, to be used in the URL; (v) when there are errors with respect to the "special characters," the REST request will typically fail, meaning that the application will not work; (vi) customers become frustrated when applications do not work because of errors with respect to the "special characters"; and/or (vii) development team can have difficulty diagnosing these kinds of errors because the application works when the development team runs it with correct URLs.

Some embodiments of the present invention may include one, or more, of the following features, characteristics, operations and/or advantages: (i) fixes an improperly encoded URL (uniform resource locator) of a REST API (representational state transfer—application programming interface) call; (ii) detects malformed URLs because of incorrect encoding; (iii) the system learns about valid URL patterns by observing which historical requests have succeeded (HTTP (hypertext transfer protocol) response code 2xx) and which have failed; (iv) this knowledge can be used to predict which portion of the URL was subject to improper encoding when a request fails; (v) upon detection, the situation can be logged, and the development team notified; (vi) the system may attempt to fix the call until the code is properly set in the web application; (vii) may be implemented, for example, as a part of a generic proxy service provided by a cloud provider; (viii) URL correction software according to an embodiment of the present invention may be implemented as a library for client code; and/or (ix) URL correction software according to an embodiment of the present invention may be implemented as library for server code.

Consider the following API:
GET /api/artists
GET /api/artists/{BAND_NAME}
GET /api/artists/{BAND_NAME}/albums
GET /api/artists/{BAND_NAME}/albums/{ALBUM_NAME}

The following paragraphs will discuss three different URLs to show how machine logic can use correct URLs to help create machine logic based rules for correcting errors in other URLs that are subsequently received.

In a first example (called "Case 1"), the following are valid requests for: (i) an artist entity called "Fakebandname"; and (ii) another entity for a music album called "Fakealbum" by Fakebandname:
GET /api/artists/Fakebandname
GET /api/artists/Fakebandname/albums/Fakealbum It is noted that these are valid URLs regardless of whether the URI path segments (Fakebandname, Fakealbum) were encoded or not. To add clarification to the previous paragraph, URL encoding is performed by substituting special characters with an escaped character sequence, e.g. space (" ") is replaced by "%20" and slash ("/") is replaced with "%2F" (as is shown in the example method of the previous sub-section of this Detailed Description section). Regular characters (other than the special characters) remain unsubstituted. Therefore, a string of characters that doesn't contain special characters looks the same after URL encoding. It is impossible to determine if such a string was URL encoded or not.

In a second example (called "Case 2"), the following requests are also valid requests for entity Pretend/Orchestra and their album Pretend Reality because the variables are URL encoded. Typically, the REST calls are performed by software, for example, one microservice calls another microservice on the server side, or an application client (e.g. web application in browser) calls server. In each of that cases URL encoding should be programmed to be performed automatically in the piece of software that makes the call.
GET /api/artists/Pretend%2FOrchestra
GET /api/artists/AC%2FDC/albums/Pretend%20in%20Reality In a third example (called "Case 3"), the following URL encoding formally looks valid, but will not work, or, at least, will not work as expected:
GET /api/artists/Pretend/Orchestra
The problem, here in Case 3, is that Pretend/Orchestra has not been URL encoded, so the slash "special character" that is part of the name of the band (as expressed in natural language) will be parsed as a URI path segment separator rather than part of BAND_NAME segment. This Case 3 request would result in an error (for example, a 404 error) because there is no endpoint listening to requests as follows:
GET /api/artists/{BAND_NAME}/Orchestra.

In some embodiments of the present invention, the solution is to learn from successful requests (Case 1 & Case 2) what the syntax for valid URI patterns are for the API. When a request fails (as in Case 3) an attempt is made to combine segments and URL encode them to match detected API patterns and retry the GET request. Path segments are the pieces of URL path which are separated by slash ("/").

A method according to an embodiment of the present invention for recognizing a malformed URL will now be described in this paragraph. This embodiment is implemented in the proxy. The proxy may take the form of a piece of software on the server side which receives incoming requests and forwards them to microservice which does the actual business logic. Proxy may have additional capabilities, such as load balancing requests between multiple instances of the same microservice or perform some basic transformation of the request.

The method, introduced in the previous paragraph, includes the following operations: (i) determine that an incoming GET request that has succeeded (2xx response code); (ii) split the URL path into segments, separated by slash(es) (for example, '/api/artists/Fakebandname'=>['api', 'artists', 'Fakebandname']); (iii) add this information to a table with correct request URIs, distributed by path length (for example, VALID_PATHS_BY_LENGTH[3]=[['api', 'artists', 'Fakebandname'], ['api', 'artists', 'Pretend%2FOrchestra'] . . . ]; (iv) create a pattern with all recognized values for each segment (for example, /api/astist/ (Fakebandname|Pretend%2FOrchestra); and (v) when there are more values recorded for a segment than some configurable threshold (MAX_ENUM_VALUES) stop storing the values there and replace it with a wildcard character (for example, "*"). This way for each path length system has a pattern that for every segment has either a constant string, a list of values, or a wildcard.

Further with respect to operation (i) in the method of the previous paragraph, when the proxy makes a request to the destination microservice, the microservice processes the request and depending on results sends back response, including the standarized HTTP response code. HTTP response code is a three digit number. HTTP is the most common protocol for making REST requests. When proxy receives the response (including response code) it typically sends back this response to the client that made the call. Because the response codes are standarized, any piece of software or network device occurs between the sender (client application) and destination can recognize if the request was successful (these are response codes starting with 2, e.g. 200, 201, 202, 204).

An embodiment of a method according to the present invention that is used for failed requests (for example, requests that get a 404 response) includes the following operations: (i) split URI path segments, separating the segments by slash characters; (ii) try to URL encode combinations of one, or more, adjacent segments to determine whether any combination matches any existing pattern in the table mentioned in the previous paragraph; (iii) report the problem (including request URL that failed and suggested fix) by various methods (for example, write in logs, send email or other notification to development team); and/or (iv) (optionally) retry the request with the fixed URI.

Some embodiments of the present invention may include one, or more, of the following operations, characteristics, features and/or advantages: (i) extended embodiment to be used not only with GET requests but also with some dangerous methods (for example, PUT, POST, DELETE); and/or (ii) a similar approach can be taken with query string parameters. In the HTTP protocol standard, the request destination is determined by URL and an HTTP method. There are several standardized methods. Each method has some standardized expected behavior. The most common is GET method, which is typically used to get(read) a resource from the server. Method GET is considered "safe" because it does not modify anything on the server. The "dangerous" methods are those which are expected to modify state of the server and therefore if used incorrectly may corrupt the server state. The dangerous methods are: PUT, POST (they both upload some information to the server) and DELETE (which is used to ask server to remove a resource). Automatically modifying (fixing) URL of a GET request is a low risk operation because GET is safe and even if the request URL was modified incorrectly, it should not have any impact on the server. However, such automatic modification of URL of a dangerous method may cause unexpected damage to server data if the automatic URL fixing mechanism made a wrong modification.

A method for detecting and fixing improperly encoded URL of REST API call in a cloud system includes the following operations (not necessarily in the following order): (i) observing API calls and checking HTTP response codes to determine if it was successful or not; (ii) learning URL patterns of successful API calls; (iii) upon detection of a failed call, attempting to concatenate and URL-encode adjacent path segments of the failed call URL; (iii) checking if any of the resulting URLs are matching any of the patterns for known successful APIs; (iv) upon finding a match, record that as an error in a log file or use another communication channel to notify developers about detected problems and suggested fixes; and (v) upon finding a match, use the matching URL to retry the API call.

Some embodiments of the present invention may include one, or more, of the following features, characteristics and/or advantages: (i) detects and corrects missing encoding in URLs; (ii) focuses on missing encoding of URL segments; (iii) fixes broken URLs of request issued programmatically; (iv) handles URLs that are missing proper encoding; (v) resolves missing proper encoding in URL path and query string; (vi) aimed at fixing problems with API calls (typically performed as part of communication between multiple programs rather than invoked by user directly), in which case user cannot be involved in fixing the URLs; (vii) learning expected structure of URLs for a particular service, which allows to fix a URL even if it's correct form hasn't been encountered yet; (viii) aimed at fixing a problem that occurs commonly with API URLs, (that is, missing encoding); (ix) deals with operational situations where API URLs are dynamic (they contain of groups of URLs with same structure but different unique identifiers) so URLs for recent resources are not likely to be indexed in a search engine; (x) deals with operational situations where most of APIs are private (are not indexed by public search engines); (xi) does not rely on a search engine to fix the URL; (xii) fixes structural problems caused by wrong encoding; and/or (xiii) learns the proper structure of URLs and fix encoding to match the known structure.

Figure 5:
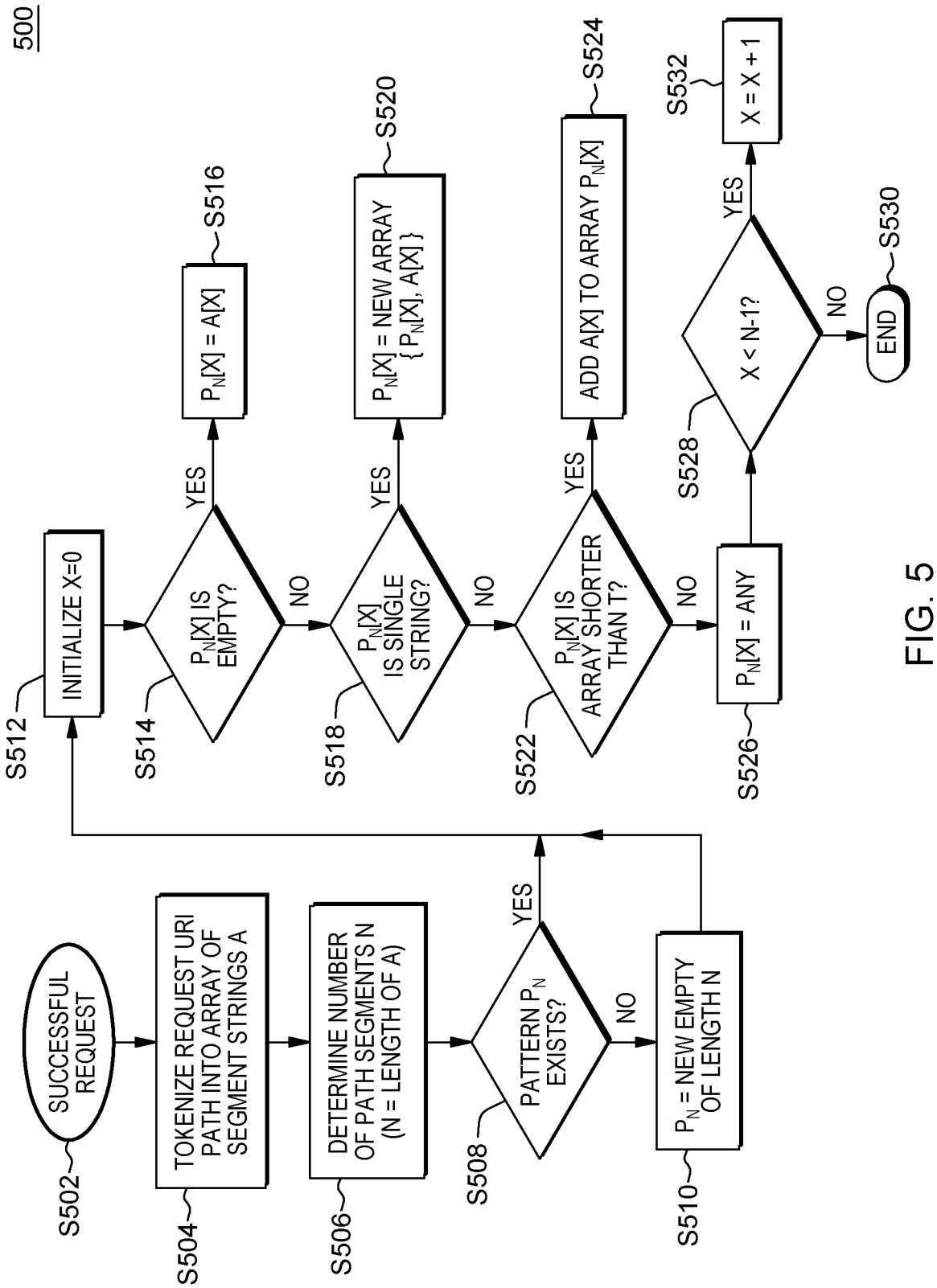
FIG. 5 is a flowchart showing a second embodiment of a method performed according to the present invention.

Flow chart 500 of FIG. 5 shows an embodiment of a method according to the present invention. The method of flow chart 500 includes the following operations (with process flow among and between the operations as shown by arrows in FIG. 5): S502, S504, S506, S508, S510, S512, S514, S516, S518, S520, S522, S524, S526, S528, S530 and S532.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
    receiving a plurality of historical UR (uniform resource) data sets, with each historical UR data set including information indicative of a UR path string;
    determining, by machine logic, a first UR pattern based on at least some UR data sets of the plurality of UR data sets;
    receiving a new UR data set, with the new UR data set including information indicative of a new UR path string;
    determining, by machine logic, that the UR path string of the new UR data set is close to the first pattern and has an error that prevents the UR path string of the new UR request from fully matching the first pattern; and
    correcting, by machine logic, the UR path string of the new UR data set, to fully match the first pattern to obtain a corrected version of the new UR data set;
    wherein:
    the new URL data set is a request for a REST (representational state transfer) server; and the new URL data set further includes a command.

2. The CIM of claim 1 wherein:
    the first pattern includes a plurality of separator characters;
    the determination that the UR path string of the new UR data set is close to the first pattern and has an error, includes a determination that the UR path string of the new UR data set is erroneous in that it includes an extraneous instance of the separator character; and
    the correction of the UR path string includes replacing the extraneous separator code with UR code for the character corresponding to the extraneous instance of the separator character.

3. The CIM of claim 2 wherein:
    the separator character is a slash; and
    the UR code for the character corresponding to the extraneous instance of the separator code is a percent encoding sub-string.

4. The CIM of claim 1 wherein the command of the new URL data set is one of the following: GET, PUT or DELETE.

5. The CIM of claim 1 wherein:
    the first pattern includes an ordered plurality of parts including a plurality of separator character parts and a plurality of UR attribute string parts; and
    at least one UR attribute string of the plurality of UR attribute string parts is a variable string that can vary, at least somewhat, with respect to alphanumeric characters that will meet the UR attribute string.

6. A computer program product (CPP) comprising:
    a set of storage device(s); and
    computer code stored collectively in the set of storage device(s), with the computer code including data and instructions to cause a processor(s) set to perform at least the following operations:
    receiving a plurality of historical UR (uniform resource) data sets, with each historical UR data set including information indicative of a UR path string,
    determining, by machine logic, a first UR pattern based on at least some UR data sets of the plurality of UR data sets,
    receiving a new UR data set, with the new UR data set including information indicative of a new UR path string,
    determining, by machine logic, that the UR path string of the new UR data set is close to the first pattern and has an error that prevents the UR path string of the new UR request from fully matching the first pattern, and
    correcting, by machine logic, the UR path string of the new UR data set, to fully match the first pattern to obtain a corrected version of the new UR data set,
    wherein:
    the new URL data set is a request for a REST (representational state transfer) server, and
    the new URL data set further includes a command.

7. The CPP of claim 6 wherein:
    the first pattern includes a plurality of separator characters;
    the determination that the UR path string of the new UR data set is close to the first pattern and has an error, includes a determination that the UR path string of the new UR data set is erroneous in that it includes an extraneous instance of the separator character; and
    the correction of the UR path string includes replacing the extraneous separator code with UR code for the character corresponding to the extraneous instance of the separator character.

8. The CPP of claim 7 wherein:
    the separator character is a slash; and
    the UR code for the character corresponding to the extraneous instance of the separator code is a percent encoding sub-string.

9. The CPP of claim 6 wherein the command of the new URL data set is one of the following: GET, PUT or DELETE.

10. The CPP of claim 6 wherein:
    the first pattern includes an ordered plurality of parts including a plurality of separator character parts and a plurality of UR attribute string parts; and
    at least one UR attribute string of the plurality of UR attribute string parts is a variable string that can vary, at least somewhat, with respect to alphanumeric characters that will meet the UR attribute string.

11. A computer system (CS) comprising:
a processor(s) set;
a set of storage device(s); and
computer code stored collectively in the set of storage device(s), with the computer code including data and instructions to cause the processor(s) set to perform at least the following operations:
    receiving a plurality of historical UR (uniform resource) data sets, with each historical UR data set including information indicative of a UR path string,
    determining, by machine logic, a first UR pattern based on at least some UR data sets of the plurality of UR data sets,
    receiving a new UR data set, with the new UR data set including information indicative of a new UR path string,
    determining, by machine logic, that the UR path string of the new UR data set is close to the first pattern and has an error that prevents the UR path string of the new UR request from fully matching the first pattern, and
    correcting, by machine logic, the UR path string of the new UR data set, to fully match the first pattern to obtain a corrected version of the new UR data set, wherein:
the new URL data set is a request for a REST (representational state transfer) server, and
the new URL data set further includes a command.

12. The CS of claim 11 wherein:
the first pattern includes a plurality of separator characters;
the determination that the UR path string of the new UR data set is close to the first pattern and has an error, includes a determination that the UR path string of the new UR data set is erroneous in that it includes an extraneous instance of the separator character; and
the correction of the UR path string includes replacing the extraneous separator code with UR code for the character corresponding to the extraneous instance of the separator character.

13. The CS of claim 12 wherein:
the separator character is a slash; and
the UR code for the character corresponding to the extraneous instance of the separator code is a percent encoding sub-string.

14. The CS of claim 11 wherein the command of the new URL data set is one of the following: GET, PUT or DELETE.

15. The CS of claim 11 wherein:
the first pattern includes an ordered plurality of parts including a plurality of separator character parts and a plurality of UR attribute string parts; and
at least one UR attribute string of the plurality of UR attribute string parts is a variable string that can vary, at least somewhat, with respect to alphanumeric characters that will meet the UR attribute string.

* * * * *